United States Patent [19]

Turner

[11] Patent Number: 5,296,068
[45] Date of Patent: Mar. 22, 1994

[54] METHOD OF MAKING AN INTERIOR TRIM PANEL WITH ENTRAPPED FASTENERS

[75] Inventor: Douglas H. Turner, Troy, Mich.

[73] Assignee: Cadillac Products, Inc., Troy, Mich.

[21] Appl. No.: 888,167

[22] Filed: May 26, 1992

Related U.S. Application Data

[62] Division of Ser. No. 767,864, Sep. 30, 1991, Pat. No. 5,178,927.

[51] Int. Cl.$^5$ .......................... B32B 31/00; B32B 3/06
[52] U.S. Cl. .................... 156/228; 156/308.2; 156/322; 428/71; 428/99; 428/160
[58] Field of Search .............. 156/91, 92, 293, 245, 156/322, 228, 242, 288, 308.2; 428/99, 102, 223, 71, 316.6, 160, 218

[56] References Cited

U.S. PATENT DOCUMENTS

| | | | |
|---|---|---|---|
| 3,316,137 | 4/1967 | Wisotzky | 156/322 |
| 3,632,465 | 1/1972 | Hardingham | 156/92 |
| 4,020,207 | 4/1977 | Alfter et al. | |
| 4,214,788 | 7/1980 | Srock . | |
| 4,316,758 | 2/1982 | Suzuki et al. | 156/563 |
| 4,411,944 | 10/1983 | Moore . | |
| 4,663,210 | 5/1987 | Schreiber | 428/316.6 |
| 4,741,945 | 5/1988 | Brant . | |
| 4,761,871 | 8/1988 | O'Connor et al. | 156/92 |
| 4,919,470 | 4/1990 | Muller . | |
| 4,923,542 | 5/1990 | Janicki et al. | 156/92 |
| 4,996,090 | 2/1991 | Steinke et al. | 156/245 |
| 5,073,429 | 12/1991 | Steinke et al. | 428/71 |

Primary Examiner—Michael W. Ball
Assistant Examiner—R. Robey
Attorney, Agent, or Firm—Harness, Dickey & Pierce

[57] ABSTRACT

A multi-layer laminated trim panel having a first sheet of high density cross-linked polyethylene foam, a second sheet of low density cross-linked polyethylene foam, a plurality of fasteners wherein the fastener heads are entrapped between the first and second sheets of cross-linked polyethylene foam, and an external cover sheet of cloth or vinyl. Additional sheets or pieces of cross-linked polyethylene foam can be incorporated between the first and second sheets of cross-linked polyethylene foam. Various methods of manufacturing the trim panels of the present invention are also disclosed.

27 Claims, 3 Drawing Sheets

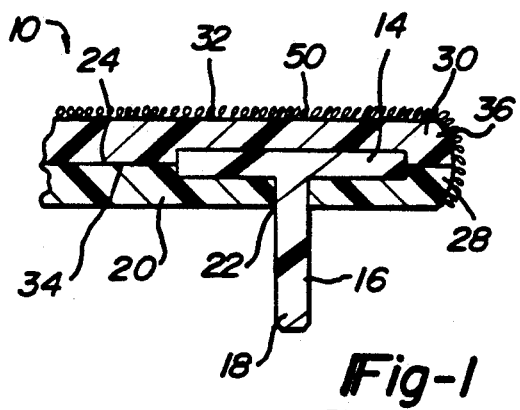 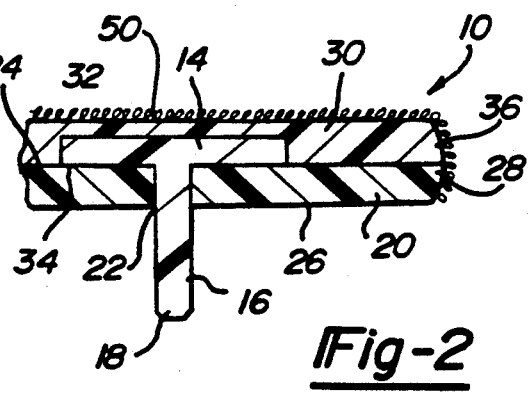
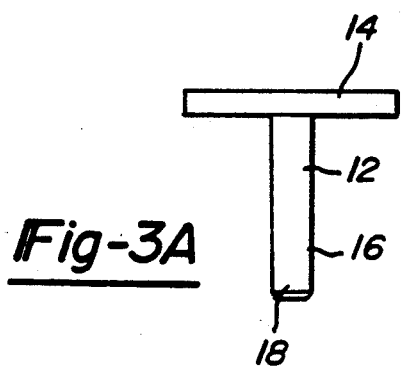 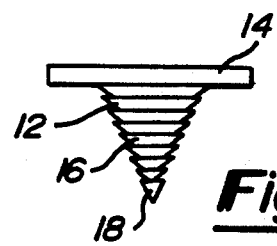
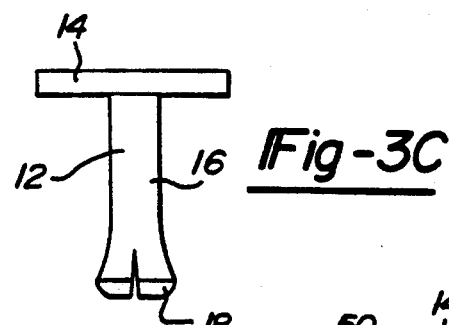 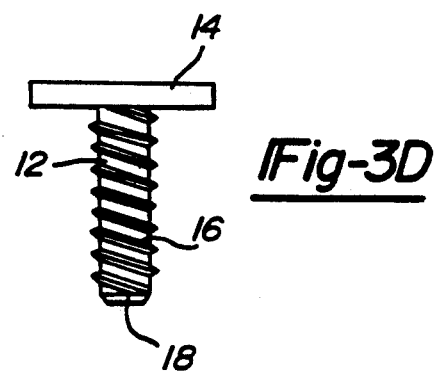
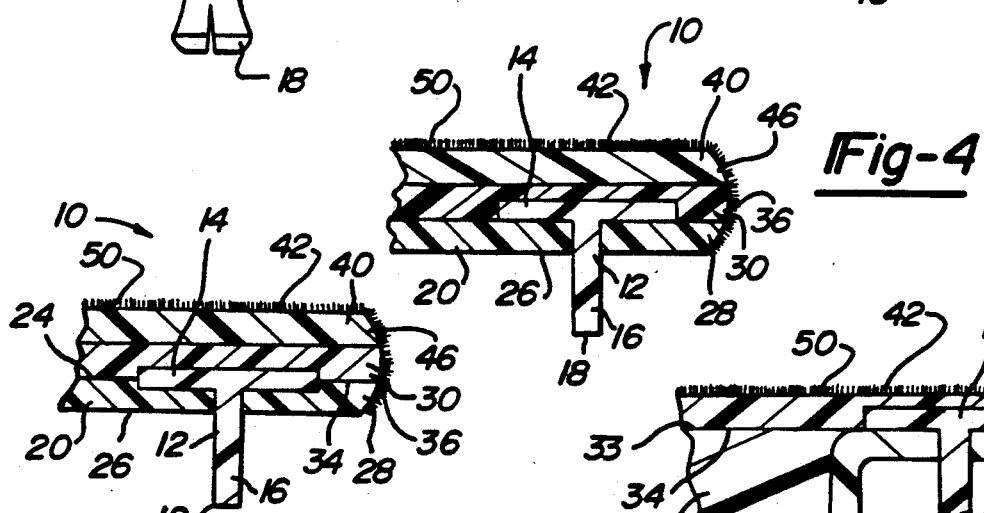 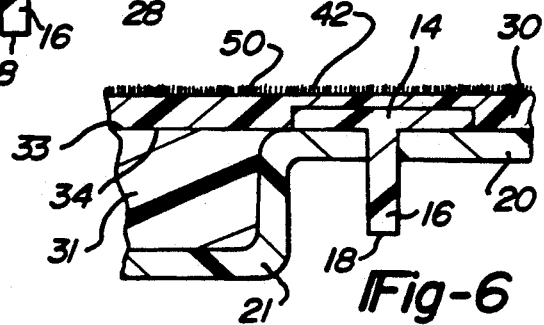

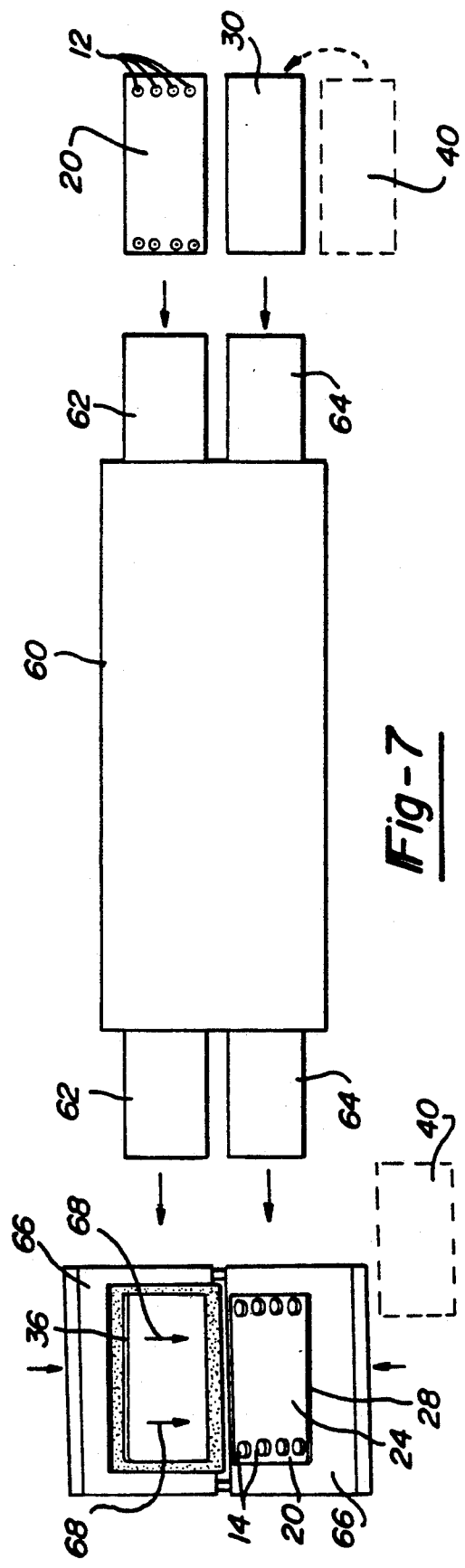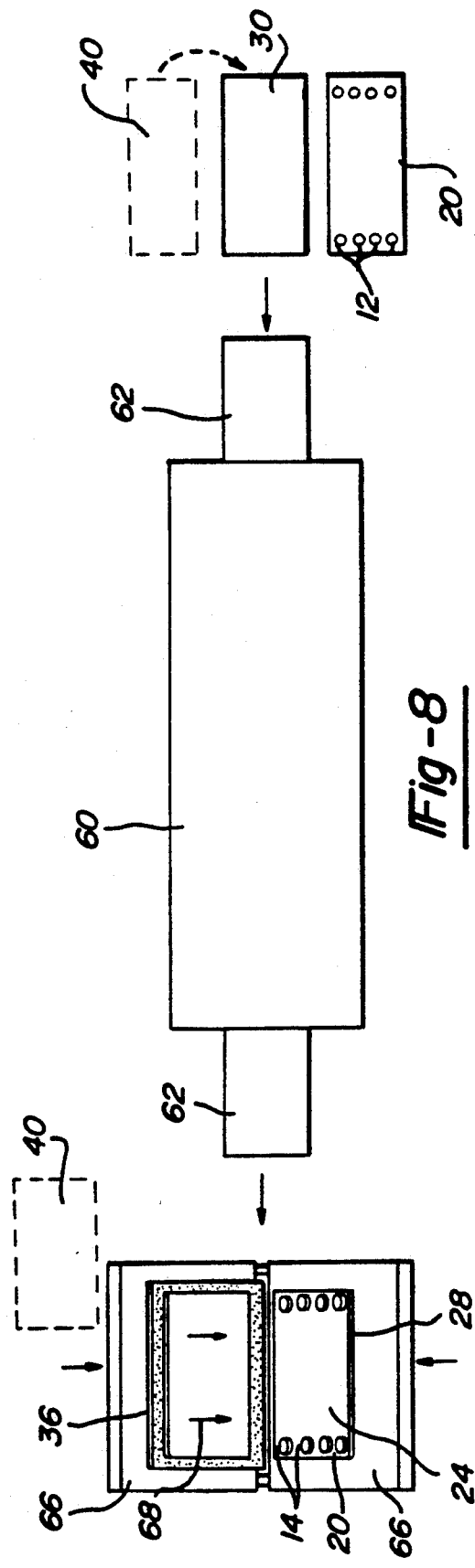

METHOD OF MAKING AN INTERIOR TRIM PANEL WITH ENTRAPPED FASTENERS

This is a division of U.S. patent application Ser. No. 767,864, filed Sep. 30, 1991 now U.S. Pat. No. 5,178,927.

BACKGROUND AND SUMMARY OF THE INVENTION

The present invention relates to vehicle trim assemblies and more particularly, to multi-layer laminated trim panels having fastening means entrapped between sheets of cross-linked polyethylene foam for attachment to automobile doors, quarter panels, instrument panels, pillars and other interior panels.

Individuals in the market for an automobile consider the aesthetic characteristics and safety features of the vehicle to be important factors in the car buying decision. In response, the automobile industry has been striving to improve the overall appearance of automobiles, including automobile trim assemblies, while simultaneously enhancing the safety features. Consequently, there is a high demand for durable, decorative interior sub-assemblies which can be easily attached to interior vehicle surfaces and which serve to cushion interior vehicle surfaces.

It is therefore a primary object of the present invention to provide a durable, decorative trim assembly which can be easily attached to interior vehicle surfaces and provides vehicle surfaces with enhanced cushioning.

Other advantages and features will become apparent from the following specification taken in connection with the accompanying drawings.

BRIEF DESCRIPTION OF THE DRAWINGS

FIG. 1 is a cross-sectional side view of a two-layer laminated trim panel incorporating fasteners which are partially embedded within the first and second layers.

FIG. 2 is a cross-sectional side view of a two-layer laminated trim panel incorporating fasteners which are partially embedded within the second layer.

FIGS. 3A through 3D are diagrammatic views of various types of fasteners which can be utilized with the present invention.

FIG. 4 is a cross-sectional side view of a three-layer laminated trim panel incorporating fasteners which are partially embedded with the first and second layers.

FIG. 5 is a cross-sectional side view of a three-layer laminated trim panel incorporating fasteners which are partially embedded within the second layer.

FIG. 6 is a cross-sectional side view of a two-layer laminated trim panel incorporating a bun between the first and second layers for additional padding.

FIG. 7 is a schematic view demonstrating a method of manufacturing the embodiments of FIGS. 1 and 5.

FIG. 8 is a schematic view demonstrating a method of manufacturing the embodiments of FIGS. 2 and 4.

DESCRIPTION OF THE PREFERRED EMBODIMENT

Figure 9:
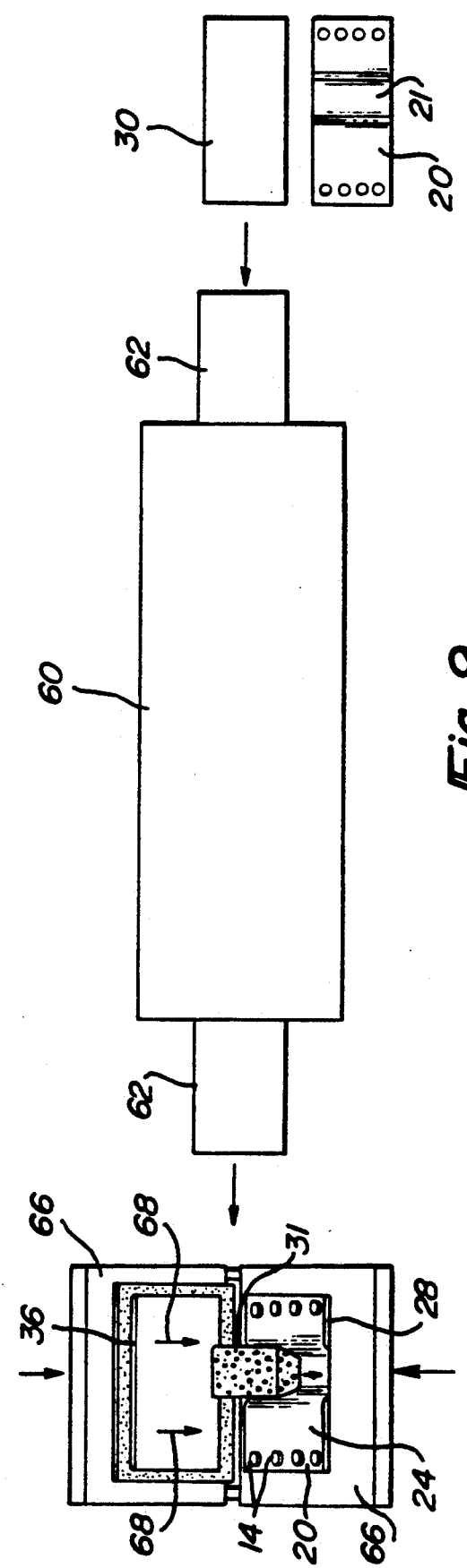
FIG. 9 is a schematic view demonstrating a method of manufacturing the embodiment of FIG. 6.

The present invention is illustrated for exemplary purposes embodying relatively rectangular shaped multi-layer laminated trim panels. It will be understood that the multi-layer laminated trim panels can be contoured according to the customer's needs.

The major components of the multi-layer laminated trim panel 10, as shown in FIG. 1, include a first sheet of relatively low density cross-linked polyethylene foam 20, a second sheet of relatively low density cross-linked polyethylene foam 30 and a plurality of fasteners 12 wherein the fastener heads are entrapped between the first and second sheets of cross-linked polyethylene foam. A third sheet of cross-linked polyethylene foam 40 as shown in FIGS. 4 and 5 can also be included. Likewise, one or more buns in FIG. 6 can be incorporated between the first and second sheets. Each of the multi-layered trim panel embodiments can be provided with an external covering 50.

Various different types of conventional fasteners 12 can be utilized with the present invention as demonstrated by FIGS. 3A through 3D. The type of fastener is selected according to the customer's needs. Although many different types of fasteners may be used, it has been determined that fasteners having a relatively large flat head are best suited to limit the foam breakaway values during the manufacturing process and to maximize ultimate fastening strength.

The present invention resides in the assembly of the trim panel, which has fasteners entrapped between first and second sheets of cross-linked polyethylene foam 20 and 30, respectively. It has been determined that fasteners having an elongated flat head are best suited for the invention. Referring to the embodiments of FIGS. 1 and 2, the trim panel 10 includes a first sheet of relatively high density cross-linked polyethylene foam 20 having a top surface 24, a bottom surface 26 and one or more side edges 28 depending on the desired shape of the trim panel. This first sheet of cross-linked polyethylene foam 20 generally has a thickness in the range of between about 0.100 and about 0.150 inches with a standard thickness of approximately 0.125 inches. For the purposes of this invention, relatively high density cross-linked polyethylene foam is defined as cross-linked polyethylene foam having a density in the range of between about 10 lbs/ft.$^3$ to about 14 lbs./ft.$^3$. A preferred high density cross-linked polyethylene foam is Huls' brand XJ1200 which has a density of approximately 12 lbs/ft.$^3$.

The first sheet 20 is formed with a plurality of apertures 22 at preselected locations along the sheet which provide for the attachment of any one of several different types of mechanical fasteners 12. Upon complete insertion into the apertures 22, the fastener heads 14 abut the top surface 24 of the first sheet 20 and the leading end 18 of the fastener shaft 16 extends beyond the bottom surface 26.

A second sheet of relatively low density cross-linked polyethylene foam 30 also includes a top surface 32, a bottom surface 34 and one or more side edges 36. The second sheet 30 is positioned contiguously upon the first sheet 20 such that the bottom surface 34 of this second sheet 30 is bonded to the top surface 24 of the first sheet 20, thereby entrapping the fastener heads 14. The second sheet 30 has a general thickness in the range of between about 0.100 and about 1.500 inches. The thickness of the second sheet 30 is dictated by the customer's needs. For example, when the trim panel 10 is to be used on pillars, mainly for decorative purposes, the sheet thickness tends to be about 0.125 inches, however, when the trim panel 10 is to be used for side impact protection on vehicle doors, the thickness tends to be about 1.500 inches. It will be understood that the second sheets' thickness can be varied over the course of the sheet to provide the sheet with a contoured appearance. For the purposes of this invention, relatively low density cross-linked polyethylene foam is defined as cross-linked polyethylene foam having a density in the range of between about 2 lbs./ft$^3$ to about 4 lbs./ft$^3$. Huls' brand XJ200, which has density of approximately 2 lbs./ft$^3$ is a preferred brand.

A cover sheet 50 made of a cloth, vinyl or a combination of cloth and vinyl is bonded to the top surface 32 of the second sheet 30 and the side edges 28 and 36 of both the first and second sheets 20 and 30 to provide the multi-layer laminated trim panel 10 with a decorative appearance. Milliken 302WCK Textura is a preferred brand of decorative cloth and Haartz 5A is a preferred brand of vinyl. An adhesive or bonding agent may be applied to the top surface 32 and side edges 28 and 36 of the second sheet 30 before the cover sheet 50 is bonded to the top surface 32 for increased adhesion. A film adhesive such as Avery Fastape 8706UHA or a spray adhesive such as XR-1305/1375 brand by the H. B. Fuller Co. are preferred brands.

Referring to embodiments of FIGS. 4 and 5, three-layer laminated trim panels are shown, wherein the second sheet 30 of cross-linked polyethylene foam is sandwiched between first and third sheets 20 and 40, respectively. In these embodiments, the first sheet is comprised of relatively high density cross-linked polyethylene foam and the third sheet is comprised of relatively low density cross-linked polyethylene foam as previously described. The second sheet of cross-linked polyethylene foam 30 generally has a medium density in the range of about 6 lbs./ft$^3$ to about 8 lbs./ft$^3$. Huls' brand XJ600, which has a density of approximately 6 lbs./ft$^3$ is a preferred brand. The second sheet 30 is positioned contiguously upon the first sheet 20 such that the bottom surface 34 of the second sheet 30 is bonded to the top surface 24 of the first sheet 20, thereby entrapping the fastener heads 14. The third sheet 40 is positioned contiguously upon the second sheet 30 such that the bottom surface 44 of the third sheet is bonded to the top surface 32 of the second sheet 30. A cover sheet 50 is bonded to the top surface 42 of the third sheet 40 and the side edges 28, 36 and 46 of sheets 20, 30 and 40 respectively. Again, it may be desirable to provide the top surface 42 and side edges 28, 36 and 46 with an adhesive such as Avery Fastape 8706UHA or H.B. Fuller Co. brand XR-1305/1375.

Referring to FIG. 6, a trim panel 10 which can be used for side impact protection includes a first thermoformed sheet of relatively high density cross-linked polyethylene foam 20 having a recessed portion 21 is shown. The recessed portion 21 houses a piece of cross-linked polyethylene, referred to herein as a bun, having a density in the range of between about 6 lbs./ft$^3$ to about 8 lbs./ft$^3$. A second sheet of relatively low density cross-linked polyethylene foam 30 is positioned upon the first sheet 20 such that the fastener heads 14 are entrapped between the first and second sheets 20 and 30 and the bun 21 is entrapped within the recessed portion 21 of first sheet 20 below the second sheet 30.

The various multi-layer laminated trim panels 10 can be manufactured as demonstrated in FIGS. 7, 8, and 9, where like reference numerals are used for similar parts. The embodiments of FIGS. 1 and 5 are manufactured according to the method demonstrated in FIG. 7. A heating oven 60 heated to about 300° F. having two separate conveyors 62 and 64 which are operable at different speeds is shown. A first sheet of relatively high density cross-linked polyethylene foam 20 containing fasteners 12 inserted through apertures 22 is placed upon the first conveyor 62 which carries the sheet 20 into the oven 60. When this first sheet 20 reaches a predetermined point within the oven 60, a second sheet of relatively low density cross-linked polyethylene foam 30 is placed on the second conveyor 64 which carries it into the oven 60. The more dense first sheet 20 requires a greater amount of oven exposure time than the less dense second sheet 30 to become sufficiently tacky for subsequent chemical bonding of the sheets to occur. The first conveyor 62 is therefore run at a slower speed than the second conveyor 64 so that the first sheet 20 exits the oven 60 just prior to the second sheet 30.

Once the first sheet 20 has exited the oven 60, the first sheet 20 is placed in a compression mold press 66 with the fastener heads 14 facing upwardly. Shortly thereafter, while the first sheet 20 is still hot, the second sheet 30 is placed contiguously over the first sheet in the compression mold press 66 as demonstrated by arrows 68 so that the fastener heads 14 are positioned between the first and second sheets 20 and 30, respectively. The cover sheet 50 is then positioned over the first surface 32 of second sheet 30 and the compression mold press 66 is closed to cut and form the trim panel 10 to its specified shape and size. Depending upon the customer's needs, an adhesive may be applied over the first surface 32 of the second sheet 30 and the side edges of the first sheet 20 prior to positioning the cover sheet 50 over the second sheet 30. When the compression mold press 66 is closed, the fastener heads 14 become partially recessed into the first surface 26 of the first sheet 20 and the second surface 34 of the second sheet 30 due to the flaccid nature of the first and second sheets 20 and 30. By recessing the fastener heads 14, the trim panel 10 obtains structural rigidity once the trim panel 10 cures.

The embodiment of FIG. 5 is manufactured similarly to the embodiment of FIG. 1 except that a third sheet of cross-linked polyethylene foam 40, shown in phantom in FIG. 7, is provided. The third sheet of relatively low density cross-linked polyethylene foam 40 is placed upon the second conveyor 64 immediately behind the second sheet of medium density cross-linked polyethylene foam 30. The first sheet of relatively low density cross-linked polyethylene foam 20 is placed in a compression mold press 66 as it exits the oven 60 with the fastener heads 14 facing upwardly. The second sheet 30 is then placed contiguously over the first sheet in the compression mold 66 as demonstrated by arrow 68 and the third sheet 40 is contiguously positioned over the second sheet 30. Cover sheet 50 is then positioned over the first surface 42 of the third sheet 40 and the compression mold press 66 is closed to cut and form the trim panel 10 to its specified shape and size. Again, depending on the customer's needs, an adhesive may be applied over the first surface 42 of the third sheet 40 and the side edges of the first and second sheets 20 and 30 prior to positioning the cover sheet 50 over the third sheet 40. When the compression mold press 66 is closed, the fastener heads 14 become partially recessed into the top surface 26 of the first sheet 20 and the bottom surface 34 of the second sheet 30 due to the flaccid nature of the first and second sheets 20 and 30, respectively.

The multi-layer laminated trim panels 10 of FIGS. 2 and 4 are manufactured as demonstrated by FIG. 8. The embodiment of FIG. 2 is manufactured by placing a first sheet of relatively high density cross-linked polyethylene foam 20 which is at room temperature and has fasteners 12 inserted through apertures 22 in the compression mold press 66 with the fastener heads 14 facing upwardly. A second sheet of medium density cross-linked polyethylene foam 30 is placed on a conveyor 62 which carries the second sheet 30 into and through an oven 60 which is heated to about 300° F. The second sheet 30 remains in the oven 60 just long enough to become sufficiently tacky to bond to both the first sheet 20 and the cover sheet 50.

Once through the oven 60, the second sheet 30 is placed contiguously upon the first sheet 20 in the compression mold press 66 so that the fastener heads 14 are positioned between the first and second sheets 20 and 30, respectively. A cover sheet 50 is then positioned over the top surface 32 of the second sheet 30 and the compression mold press 66 which contains a mold having the three dimensional contour of a finished panel is closed, as demonstrated by arrows 68, to cut and form the trim panel to its specified shape and size. Here again, depending upon the customer's needs, an adhesive may be applied over the first surface 32 of the second sheet 30 and the side edges of the first sheet 20 prior to positioning the cover sheet 50 over the second sheet 30. The fastener heads 14 become recessed within the second sheet 30 due to the flaccid nature of the second sheet 30.

The embodiment of FIG. 4 is manufactured similarly to the embodiment of FIG. 2, except that a third sheet of cross-linked polyethylene foam 40, shown in phantom in FIG. 8, is provided. The third sheet of relatively low density cross-linked polyethylene foam 40 is placed upon the conveyor 62 just behind the second sheet of medium density cross-linked polyethylene foam 30. Once through the oven 60, which is heated to 300° F., the second sheet 30 is placed contiguously upon the first sheet in the compression mold 66 so that the fastener heads 14 are positioned between the first and second sheets 20 and 30, respectively. The third sheet 40 is then positioned over the top surface 32 of the second sheet 30 and a cover sheet 50 is placed over the top surface 42 of the third sheet 40. It may be desirable to apply an adhesive over the top surface 42 of the third sheet 40 and the side edges of the first and second sheets 20 and 30 prior to positioning the cover sheet 50 over the top surface 42. Compression mold 66 which contains a mold having the three dimensional contour of the finished panel is then closed, as demonstrated by arrow 68 to cut and form the trim panel to its specified shape and size. During compression in the compression mold, the fastener heads 14 become recessed within the second sheet 30 due to the flaccid nature of the second sheet 30.

The embodiment of FIG. 6 is manufactured as demonstrated by FIG. 9. The first sheet of thermoformed high density cross-linked polyethylene foam 20 which is at room temperature and has fasteners 12 inserted through apertures 22 is placed in the compression mold press 66 with the fastener heads 14 facing upwardly. A bun 31 made of medium density cross-linked polyethylene foam is placed within the recessed portion 21 of the first sheet 20 within the compression mold press 66. A second sheet of relatively low density cross-linked polyethylene foam 30 is placed on a conveyor 62 which carries the second sheet 30 into and through an oven 60 which is heated to about 300° F. The second sheet 30 remains in the oven 60 long enough to become sufficiently tacky to bond to both the first surface 22 of the first sheet 20, the top surface 33 of the bun 31 and the cover sheet 50.

Once through the oven 60, the second sheet 30 is placed contiguously upon the first sheet 20 and over the bun 31 in the compression mold press 66 so that the fastener heads 14 are positioned between the first and second sheets 20 and 30, respectively. A cover sheet 50 is then positioned over the top surface 32 of the second sheet 30 and the compression mold press 66 which contains a mold having the three dimensional contour of a finished panel is closed, as demonstrated by arrows 68 to cut and form the trim panel 10 to its specified shape and size. It may once again be desirable to apply an adhesive over the top surface 32 and side edges of the first sheet 30 and bun 31 prior to positioning the cover sheet 50 over the top surface 32. The fastener heads 14 become recessed within the second sheet 30 due to the flaccid nature of the second sheet 30.

While it will be apparent that the preferred embodiments of the invention disclosed are well calculated to provide the advantages above stated, it will be appreciated that the invention is susceptible to modification, variation and change without departing from the proper scope or fair meaning of the subjoined claims.

What is claimed:

1. A method of constructing a multi-layer laminated trim panel for attachment to vehicles, comprising the steps of:
   (a) inserting fastening means having a head and an extending shaft through a first sheet of high density polymeric foam defined by first and second surfaces such that the head of said fastening means abuts the first surface of said first sheet and the leading end of the shaft extends beyond the second surface of said first sheet;
   (b) heating a second sheet of low density polymeric foam in an oven; and
   (c) compressing said first and second sheets together in the absence of a separate reinforcing layer disposed between said first and second sheets to bond said first and second sheets, thereby entrapping the head of said fastening means between said first and second sheets.

2. A method of constructing a multi-layer laminated trim panel as claimed in claim 1, wherein said first and second polymeric foam sheets further comprise cross-linked polyethylene foam.

3. A method of constructing a multi-layer laminated trim panel as claimed in claim 1, wherein the head of said fastening means is partially recessed within said second sheet of polymeric foam.

4. A method of constructing a multi-layer laminated trim panel as claimed in claim 3, wherein the head of said fastening means is partially recessed within said first sheet of polymeric foam.

5. A method of constructing a multi-layer laminated trim panel as claimed in claim 1, wherein a cover sheet is included over said second sheet prior to compressing said first and second sheets.

6. A method of constructing a multi-layer laminated trim panel as claimed in claim 5, wherein an adhesive is applied over said second sheet prior to including said cover sheet.

7. A method of constructing a multi-layer laminated trim panel as claimed in claim 1, wherein said first and second sheets are compressed in a compression mold press.

8. A method of constructing a multi-layer laminated trim panel as claimed in claim 1, wherein the head of said fastening means is substantially flat.

9. A method of constructing a multi-layer laminated trim panel according to claim 1, wherein said first sheet is heated in said oven prior to being placed in said compression mold press.

10. A method of constructing a multi-layer laminated trim panel as claimed in claim 1, wherein said first and second sheets are transported through said oven on a conveyor.

11. A method of constructing a multi-layer laminated trim panel as claimed in claim 1, wherein said conveyor comprises first and second conveyor belts operable at the different speeds, wherein said first sheet is carried through said oven on said first conveyor belt and said second sheet is carried through said oven on said second conveyor belt.

12. A method of constructing a multi-layer laminated trim panel according to claim 1, wherein said first sheet of high density polymeric foam has a density of between about 10 lbs./ft.$^3$ to about 14 lbs./ft.$^3$.

13. A method of constructing a multi-layer laminated trim panel as claimed in claim 12, wherein said first sheet of high density polymeric foam has a density of about 12 lbs./ft.$^3$.

14. A method of constructing a multi-layer laminated trim panel as claimed in claim 1, wherein said second sheet of low density polymeric foam has a density of between about 2 lbs./ft.$^3$ to about 4 lbs./ft$^3$.

15. A method of constructing a multi-layer laminated trim panel as claimed in claim 14, wherein said second sheet of low density polymeric foam has a density of about 2 lbs./ft$^3$.

16. A method of constructing a multi-layer laminated trim panel as claimed in claim 5, wherein said cover sheet consists of a material selected from the group consisting of cloth, vinyl and combinations thereof.

17. A method of constructing a multi-layer laminated trim panel as claimed in claim 1, wherein at least one bun of medium density polymeric foam is provided between said first and second sheets.

18. A method of constructing a multi-layered laminated trim panel as claimed in claim 17, wherein said first and second polymeric foam sheets further comprise cross-linked polyethylene foam.

19. A method of constructing a multi-layer laminated trim panel as claimed in claim 18, wherein the head of said fastening means is partially recessed within said second sheet of polymeric foam.

20. A method of constructing a multi-layered laminated trim panel as claimed in claim 19, wherein the head of said fastening means is partially recessed within said first sheet of polymeric foam.

21. A method of constructing a multi-layered laminated trim panel as claimed in claim 18, wherein a cover sheet is included over said second sheet prior to compressing said first and second sheets.

22. A method of constructing a multi-layer laminated trim panel as claimed in claim 21, wherein an adhesive is applied over said second sheet prior to including said cover sheet.

23. A method of constructing a multi-layer laminated trim panel as claimed in claim 18, wherein said first and second sheets are compressed in a compression mold press.

24. A method of constructing a multi-layer laminated trim panel as claimed in claim 18, wherein the head of said fastening means in substantially flat.

25. A method of constructing a multi-layer laminated trim panel as claimed in claim 18, wherein said second sheet is heated in said oven prior to being placed in said compression mold press.

26. A method of constructing a multi-layer laminated trim panel as claimed in claim 25, wherein said second sheet is transported through said oven on a conveyor.

27. A method of constructing a multi-layer laminated trim panel as claimed in claim 21, wherein said cover sheet consists of a material selected from the group consisting of cloth, vinyl and combinations thereof.

* * * * *

UNITED STATES PATENT AND TRADEMARK OFFICE
CERTIFICATE OF CORRECTION

PATENT NO. : 5,296,068
DATED : March 22, 1994
INVENTOR(S) : Douglas H. Turner

It is certified that error appears in the above-indentified patent and that said Letters Patent is hereby corrected as shown below:

Column 2, line 3, "low" should be -- high --.

Column 3, line 40, after "sheet" insert -- 40 --.

Signed and Sealed this

Sixteenth Day of August, 1994

Attest:

BRUCE LEHMAN

Attesting Officer  Commissioner of Patents and Trademarks